(12) United States Patent
Chuttani et al.

(10) Patent No.: US 9,491,693 B1
(45) Date of Patent: Nov. 8, 2016

(54) OUT-OF-SERVICE SCANNING FOR MULTI-SIM DEVICES

(71) Applicant: Apple Inc., Cupertino, CA (US)

(72) Inventors: Harshit Chuttani, Newark, CA (US); Li Su, San Jose, CA (US); Madhusudan Chaudhary, Campbell, CA (US); Sang Ho Baek, Palo Alto, CA (US); Someet K. Lal, Fremont, CA (US); Thanigaivelu Elangovan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/717,536

(22) Filed: May 20, 2015

(51) Int. Cl.
*H04W 4/00* (2009.01)
*H04W 48/16* (2009.01)
*H04L 29/08* (2006.01)
*H04W 4/02* (2009.01)
*H04W 52/02* (2009.01)
*H04W 88/06* (2009.01)

(52) U.S. Cl.
CPC ............. *H04W 48/16* (2013.01); *H04L 67/16* (2013.01); *H04W 4/025* (2013.01); *H04W 52/0225* (2013.01); *H04W 88/06* (2013.01)

(58) Field of Classification Search
CPC ............. H04W 48/16; H04W 4/025; H04W 52/0225; H04W 88/06; H04L 67/16
USPC .......................................................... 455/434
See application file for complete search history.

(56) References Cited

U.S. PATENT DOCUMENTS

| 8,433,318 | B2 | 4/2013 | Krishnamoorthy et al. |
| 8,688,122 | B2 | 4/2014 | Mutya et al. |
| 2012/0264425 | A1* | 10/2012 | Krishnamoorthy ... H04W 48/16 455/434 |
| 2013/0324089 | A1* | 12/2013 | Kim ........................ G06F 21/32 455/411 |
| 2015/0065132 | A1 | 3/2015 | Ramkumar et al. |
| 2015/0079985 | A1* | 3/2015 | Vuchula ................ H04W 48/16 455/435.1 |
| 2015/0099516 | A1* | 4/2015 | Nayak ............... H04W 52/0229 455/435.3 |

* cited by examiner

*Primary Examiner* — Tanmay Shah
(74) *Attorney, Agent, or Firm* — Meyertons Hood Kivlin Kowert & Goetzel, P.C.; Jeffrey C. Hood; Joel L. Stevens (57) ABSTRACT

Apparatuses, systems, and methods for multi-SIM user equipment (UE) devices to search for service. A UE may determine that a first SIM of the UE is out-of-service. The UE may scan for service for the first SIM of the UE using a second SIM of the UE. An indication may be provided to the first SIM if service (or service information) is found for the first SIM. If the second SIM is also out-of-service, the UE may scan for service for the first SIM and the second SIM jointly.

20 Claims, 7 Drawing Sheets

OUT-OF-SERVICE SCANNING FOR MULTI-SIM DEVICES

FIELD

The present application relates to wireless devices, including apparatuses, systems, and methods for multi-SIM wireless devices to search for service.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios a wireless device may include or be capable of utilizing multiple subscriber identity modules (SIMs). Determining how to operate effectively and efficiently with multi-SIM capability may be a challenging problem. Thus, improvements in the field are desired.

SUMMARY

Embodiments are presented herein of apparatuses, systems, and methods for a multi-SIM device to search for service.

According to the techniques described herein, when a SIM of a multi-SIM device goes out-of-service (OOS), it may be possible to utilize another SIM to scan for service for the OOS SIM. This may allow the OOS SIM to remain fully asleep while the in-service SIM periodically scans for service for the OOS SIM, which may help the multi-SIM device conserve power.

Furthermore, according to the techniques described herein, in certain scenarios when multiple SIMs of a multi-SIM device go OOS, it may be possible to jointly scan for service for all of the OOS SIMs, using just one SIM of the device. Such a joint scan may include aligning timing of the OOS scans for the OOS SIMs, and/or merging frequency channel/band scan lists for the OOS SIMs (e.g., to avoid redundant scanning for bands common to multiple scan lists), which may also help the multi-SIM device conserve power.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
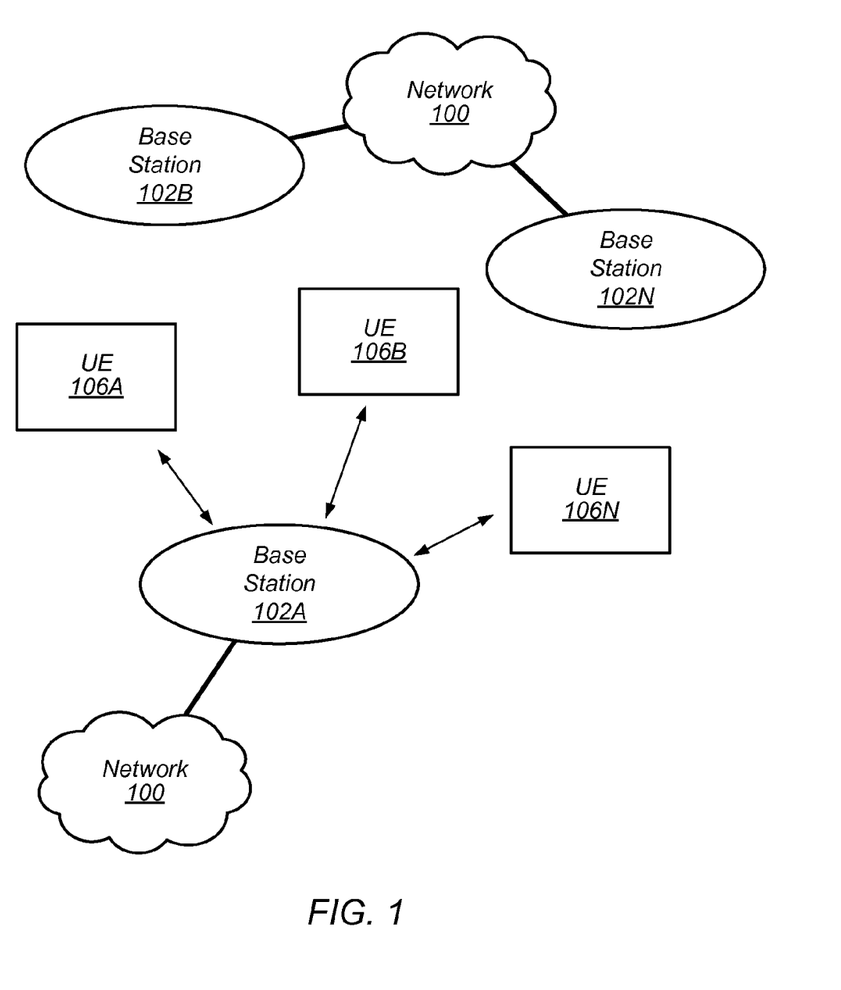
FIG. 1 illustrates an example wireless communication system according to some embodiments.
Figure 2:
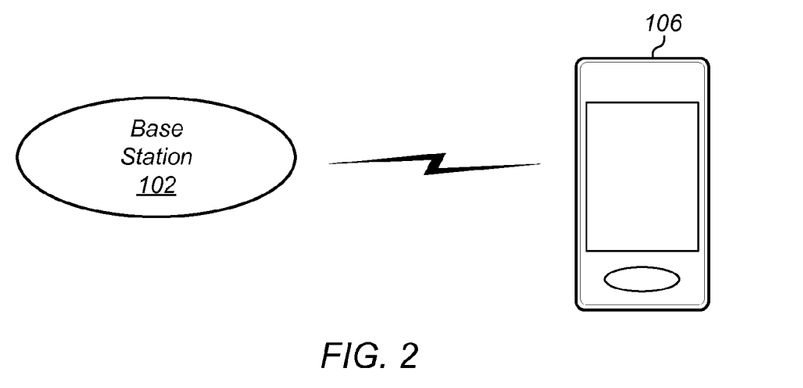
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE and 1×RTT (or LTE and GSM), and separate radios for communicating using each of Wi-Fi and Bluetooth. Other configurations are also possible.

Figure 3:
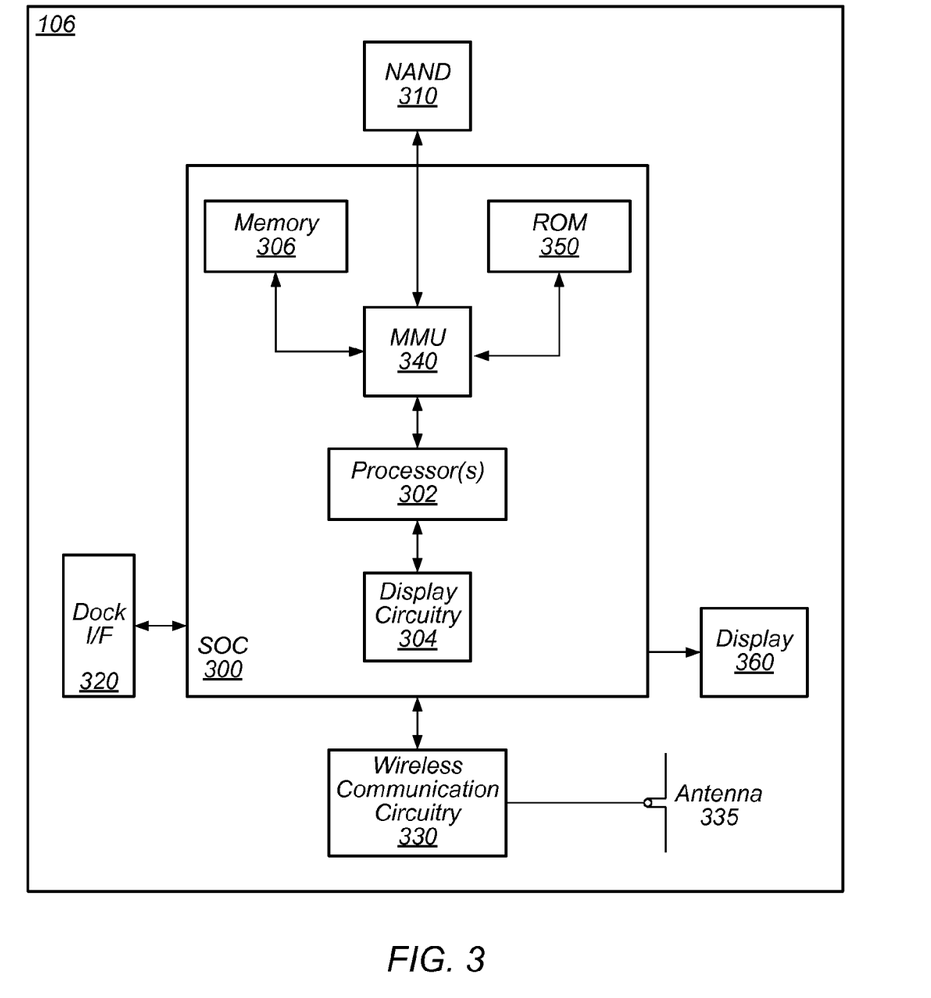
FIG. 3 illustrates an example block diagram of a UE according to some embodiments.

FIG. 3—Block Diagram of a UE

FIG. 3 illustrates an example block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As shown, the UE 106 may also include or be coupled to a SIM (Subscriber Identity Module) 370. The SIM 370 may be implemented as an application on a smart card, in some embodiments. The smart card may itself be referred to as a SIM card in some cases. As one example, the SIM 370 may be an application which executes on a Universal Integrated Circuit Card (UICC). The smart card may also include (e.g., store and/or execute) one or more other applications, if desired. The smart card may be removable.

Alternatively, the SIM 370 may be implemented as an embedded SIM (eSIM). In this case, the SIM 370 may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 306 or NAND 310) executing on a processor (such as processor 302) in the UE 106.

In some embodiments, the UE 106 may be a multi-SIM device, or may at least be multi-SIM capable. Each SIM of such a UE 106 may be implemented in any of various ways, including as a removable SIM or as an embedded SIM, among various possibilities. Dual SIM dual standby (DSDS) and dual SIM dual active (DSDA) are two examples of possible multi-SIM configurations which may be implemented by a UE 106, according to various embodiments.

The subscriber identity information may be used to identify the UE 106 to its subscriber's carrier cellular network. The subscriber identity may also be used outside of the "home" area in which the subscriber's carrier provides cellular service in some situations, for example if the subscriber's carrier has arranged any roaming agreements with other network operators so that the visited network will recognize the subscriber identity information and allow access to the network.

Note that the area in which a subscriber identity may be used to obtain cellular service via the carrier with which the subscriber identity is associated may be considered a "local service area" for the subscriber identity, in which locations the subscriber identity may be considered "local". In other words, as used herein, a UE 106 may be considered able to obtain "local service" in a location using a subscriber identity if the carrier associated with (e.g., which provided) the subscriber identity provides cellular service in that location.

Any areas in which the subscriber identity may be used to obtain cellular service via another carrier than that with which the subscriber identity is associated (e.g., via one or more roaming agreements) may be considered a "roaming service area" for the subscriber identity. In other words, as used herein, a UE 106 may be considered able to obtain "roaming service" in a location using a subscriber identity if carrier with which a roaming agreement has been negotiated by the carrier associated with the subscriber identity provides cellular service in that location.

Any areas in which the subscriber identity may not be used to obtain cellular service via the carrier with which the subscriber identity is associated or any other may be considered a "no service area" for the subscriber identity. In other words, as used herein, a UE 106 may be considered able to obtain "no service" in a location using a subscriber identity if neither the carrier associated with the subscriber identity nor any other carrier with which a roaming agreement has been negotiated by the carrier associated with the subscriber identity provides cellular service in that location. Note that cellular service may still be available (for example using a different subscriber identity associated with a local carrier) in locations for which no service is available using a particular subscriber identity, though it is also possible that no cellular service may be available at all in some (e.g., remote) locations.

As described herein, the UE 106 may include hardware and software components for implementing part or all of the methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
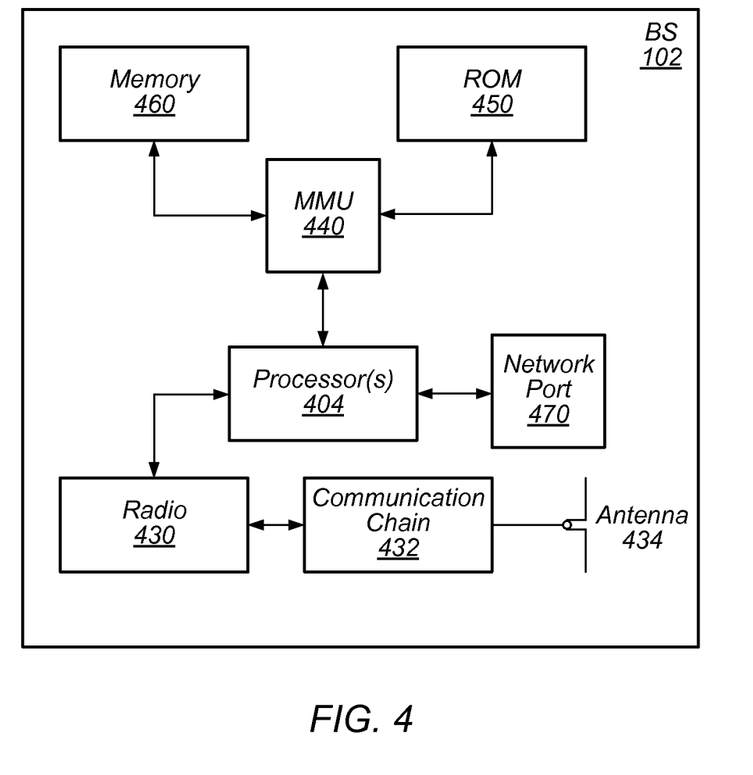
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIGS. 5-9—Flowchart Diagrams

As previously noted, in some scenarios a wireless device may be capable of utilizing multiple subscriber identity modules (SIMs). For example, dual SIM support may enable a device to be simultaneously registered with two SIMs, potentially on two different networks. Dual SIM support may include dual SIM dual standby (DSDS) support, in which a device may be simultaneously registered with two SIMs but may actively communicate with one of the networks at a time (e.g., using a shared radio), or dual SIM dual active (DSDA) support, in which a device may be simultaneously registered with two SIMs and may simultaneously actively communicate two networks at a time, among various dual SIM configurations.

Dual SIM support may be implemented in any of various ways, as desired. For example, a wireless device may provide dual SIM functionality only when the device is in a roaming state, or only when the device is registered with a home network, or both when the device is roaming and when the device is registered with a home network, among various possibilities. As another example, when dual SIM functionality is implemented different SIMs may have different availabilities with respect to voice and data communication. Thus as one possibility, a primary SIM (e.g., corresponding to a first subscription) might be made available for voice communication, while a secondary SIM (e.g., corresponding to a second subscription) might be made available for data communication. Alternate arrangements (e.g., primary SIM available for data, secondary SIM available for voice; both primary and secondary SIMs available for both voice and data; both primary and secondary SIMs available for voice only or for data only, etc.) are also possible. As a still further example, when dual SIM functionality is implemented, different SIMs may have different availabilities with respect to different radio access technologies (RATs); for example, one or more RATs available to one SIM might not be available to the other SIM (and/or vice versa), and/or one or both SIMs might have different RAT availability depending on whether the wireless device is operating in a dual SIM mode or a single SIM mode. As one possible configuration, a SIM might be configured to use any of GSM, WCDMA, and/or LTE for voice and/or data communications when operating in a single SIM mode, and might be configured with the same capabilities or only a subset of those capabilities (e.g., voice only and GSM only, as one possibility) when operating in a dual SIM mode. Numerous other configurations are also possible and should be considered within the scope of this disclosure.

Note also that in some instances, the specific configuration of a dual SIM capable wireless device at a particular time may result from any combination of hardware and/or software features of the wireless device, subscription characteristics of the SIMs used with the wireless device, and/or user preference(s), among various possible considerations and/or constraints.

While it may be possible to operate each SIM entirely independently, in at least some instances, it may be beneficial to share data and/or operations between SIMs under certain circumstances. The optimal manner and circumstances under which to implement such data and/or operation sharing may depend on the configuration of a given wireless device. In many instances, however, it may be the case that such data and/or operation sharing may reduce device power consumption and/or improve user experience, e.g., in comparison to operating each SIM independently of each other SIM of a multi-SIM capable wireless device.

As one possible example of a scenario in which it may be beneficial to share operations between SIMs of a wireless device, in at least some instances it may be possible to reduce the power consumption of a wireless device (e.g., a UE such as UE 106 illustrated in and described with respect to FIGS. 1-3) when searching for service if one SIM of the device is out-of-service (OOS) by using another SIM to search for service on behalf of the OOS SIM. As another possible example, in at least some instances it may alternatively or in addition be possible to reduce power consumption of a wireless device when searching for service if both SIMs of the device are OOS by using one SIM of the device to scan for service for multiple OOS SIMs jointly. FIGS. 5-8 are flowchart diagrams illustrating example methods that may be performed by a multi-SIM capable UE to search for service under various circumstances.

Figure 5:
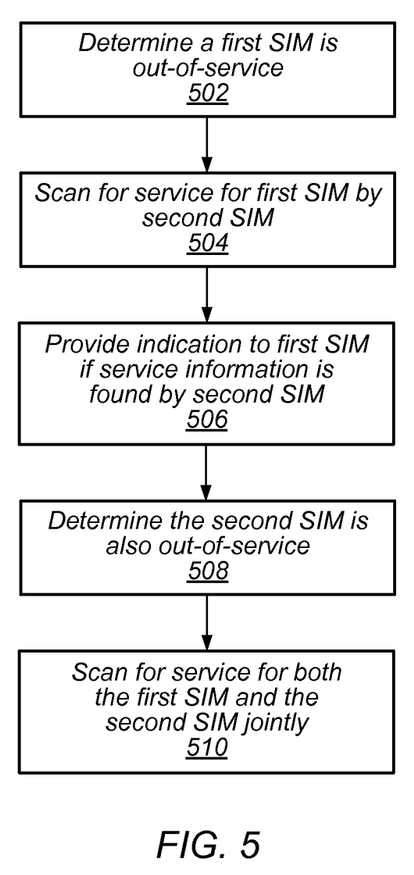
FIGS. 5-8 are flowchart diagrams illustrating example methods by which a multi-SIM capable UE may search for service, according to some embodiments.

The method shown in FIG. 5 may be used in conjunction with any of the computer systems or devices shown in the above Figures, among other devices. This method may be used in various types of cellular communication systems across any of a variety of cellular technologies. In various embodiments, some of the elements of the scheme shown may be performed concurrently, in a different order than shown, or may be omitted. Additional and/or alternative elements may also be performed as desired. As shown, the method of FIG. 5 may operate as follows.

In 502, it may be determined that a first SIM of a UE is OOS. As previously noted, a SIM may be considered OOS if no cellular system on which the SIM may camp (e.g., according to its subscription agreement and corresponding permissions) is available. At least in some instances, determination that a SIM is OOS may occur based on performing a certain amount of scanning for service without discovering any suitable cells, and/or based on unsuccessfully attempting to register with any discovered cells, among various possibilities.

As noted above, the UE may be a multi-SIM capable UE. Thus, at least in some instances, the UE may include at least a second SIM in addition to the first SIM. The UE may be capable of operating in a dual SIM mode (e.g., in which both the first SIM and teh second SIM are active) or a single SIM mode (e.g., in which just the first SIM, or just the second SIM, is active). Such a dual SIM mode may be a dual SIM dual standby (DSDS) or dual SIM dual active (DSDA) mode, among various possibilities. Note that, in some instances, the first SIM and the second SIM may provide different services, e.g., at least when in dual SIM mode. For example, it may be the case that when in dual SIM mode the first SIM provides voice services and the second SIM provides data services. As will be readily recognized, other arrangements are also possible.

Since different SIMs may have different subscription agreements with different permissions (e.g., potentially including different permissions for using various public land mobile networks (PLMNs) and/or various radio access technologies (RATs), it may in some instances be possible for one SIM of a UE to have service and for another SIM of the UE to be OOS.

The UE may operate in different modes at different times. The UE may determine in which mode to operate at a particular time in any of various possible ways. For example, as one possibility, the UE may preferably operate in a single SIM mode when in a local service area and in a dual SIM mode when in a roaming service area. As another possibility, the UE may preferably operate in a dual SIM mode if service is available for each SIM, but fall back to a single SIM mode if service is only available for one SIM.

In 504, the UE may scan for service for the first SIM using a second SIM. At least in some instances, the second SIM may be registered for service (e.g., may be 'in-service' and not OOS). Since the second SIM may be registered for service and may operate actively (e.g., in an idle mode or a connected mode) in order to maintain and utilize its service (e.g., for voice and/or data communications), at least in some instances it may be more efficient to utilize the second SIM to perform scanning/searching operations on behalf of the first SIM in between operations on behalf of the second SIM itself while the first SIM is placed into a low power (e.g., sleep) mode than using the first SIM to perform scanning/searching operations on behalf of the first SIM.

Scanning for service for the first SIM may include scanning one or more frequency channels and/or frequency bands for cellular systems with which the first SIM may be able to register and obtain service from. The frequency channels and/or frequency bands selected for scanning may be based on any of various possible considerations, including but not limited to frequency channels recently used by the first SIM, frequency channels recently or currently used by the second SIM, frequency channels for which neighboring cell information for the second SIM is available, frequency bands on which one or more PLMNs accessible by the first SIM are known or believed to be deployed based on a location of the UE, and/or any of various other possible considerations. In at least some instances, the frequencies and/or bands scanned may be based at least in part on subscription information for the first SIM (e.g., from a subscription agreement corresponding to the first SIM). Note that such frequencies and/or bands may be the same, partially different, or entirely different than those frequencies and/or bands that the second SIM would scan if searching for service on its own behalf.

In other words, scanning for service if a particular SIM of the UE goes (OOS) may include attempting to reacquire service by executing an OOS search algorithm using another SIM of the UE. The OOS search algorithm may attempt to balance between power usage and acquisition performance. In order to conserve power while executing the OOS search algorithm (and also allow the SIM which still has service to maintain and utilize that service), the UE may alternate between using the in-service SIM to operate in a scanning state on behalf of the OOS SIM, which may expend power but allow for service acquisition, and using the in-service SIM to operate normally on behalf of the in-service SIM (which may include communicating control and/or user data, performing cell measurements, transitioning between connected and idle modes, and/or any of various other possible operations, as known to those skilled in the art), while the OOS SIM remains in a low-power (e.g., sleep) state which may conserve power. As one possible OOS search algorithm, the scan times may be split into scans for most recently used frequencies and full band scans on bands likely to be found in the last camped area. After a certain period of time, one in every x (e.g., a configurable number) band scans may include all supported bands. The frequency scans may be of shorter duration than the band scans and hence may be performed at a faster rate, at least in some instances. In some embodiments, the duration of the non-scanning cycles of the UE may gradually increase as OOS duration (i.e., the period of time in which a SIM has lacked service) increases. Additionally, note that in some instances motion detection may be considered as part of an OOS search algorithm; for example, scanning/sleeping duty cycles may be modified depending on whether the UE is moving or stationary, e.g., since the likelihood of discovering service when OOS may be lower if a UE remains in the same location that the UE became OOS than if a UE moves to a new location.

In 506, an indication may be provided to the first SIM if service information is found based on scanning for service for the first SIM using the second SIM. The indication may simply indicate to the first SIM to wake up and resume searching for service, and/or may include any of various possible additional types/amounts of information to assist the first SIM with re-acquiring service. For example, if a candidate cell (or multiple candidate cells) is (are) found during a frequency channel/band scan, the first SIM may be informed of the absolute radio frequency channel number(s) (ARFCN(s)) of the potential cell(s). Any of various alternative or additional types of indication may be used, if desired, which may provide any of various types and amounts of information to the first SIM.

Upon receiving such an indication, the first SIM may wake up and attempt to acquire service. This service acquisition attempt may include frequency channel and/or band scanning to attempt to discover a suitable cellular system from which to obtain cellular service, attempting to obtain system information for such a cellular system if discovered, and/or registering for cellular service with such a cellular system. Note that if certain service information is already available to the first SIM from scanning performed using the second SIM (e.g., one or more potential cell ARFCNs), the first SIM may be able to skip one or more such steps (e.g., to proceed directly to attempt to obtain system information for one or more potential cells for which ARFCNs were provided).

In 508, it may be determined that the second SIM is also OOS. Thus, it may be the case that both the first SIM and the second SIM are OOS.

In 510, the UE may scan for service for both the first SIM and the second SIM jointly. At least in some instances, such joint scanning may be performed using one SIM (e.g., either the first SIM or the second SIM) of the UE, while the other SIM may be able to remain in a low power (e.g., sleep) state while such scanning is performed.

Scanning for service for both the first SIM and the second SIM jointly may include aligning timing of service scanning for the first SIM and the second SIM. For example, the OOS scanning algorithm duty cycles for the first SIM and the second SIM may be aligned such that scanning for both the first SIM and the second SIM occur at the same time. This may be in contrast to techniques in which each SIM scans for service for itself on an individual basis, in which scanning times and sleeping times for the different SIMs may generally be offset from each other (e.g., except for coincidental occurrences). Aligning timing of service scanning for the first SIM and the second SIM may also include restarting the OOS scanning algorithm for one of the SIMs, e.g., if it has been OOS for longer than the other SIM; for example, if the OOS scanning algorithm is 'telescoping' (e.g., if sleeping/scanning duty cycles change as OOS time increases), in order to maintain alignment of the sleeping/scanning times for the first SIM and the second SIM, it may be helpful or even necessary for the OOS scanning algorithms to be started together.

In addition, at least in some instances scanning for service for both the first SIM and the second SIM jointly may include merging frequency channel/band lists for the first SIM and the second SIM. In other words, the frequency channels and bands to be scanned for the first SIM and the frequency channels and bands to be scanned for the second SIM may be combined into a single list of frequency channels and bands to be scanned (e.g., with duplicates removed to avoid redundancy and increase the efficiency of the scanning).

If potential service information for either or both of the first SIM or the second SIM based on such joint scanning, the appropriate SIM may be notified, and may be activated to attempt to re-acquire service.

Note that while the FIG. 5 and the corresponding description thereof provided herein above provides a method by which OOS service scanning for a first SIM (or multiple SIMs) of a UE is performed using a second SIM of the UE, any of the techniques illustrated in and described with respect to FIG. 5 may be performed with the roles of the first SIM and the second SIM reversed, if desired. Thus, OOS service scanning for the second SIM (e.g., as might be triggered by the second SIM going OOS while the first SIM remains in-service or is also OOS) may be performed using the first SIM of the UE, according to any of the various embodiments described herein.

Figure 6:
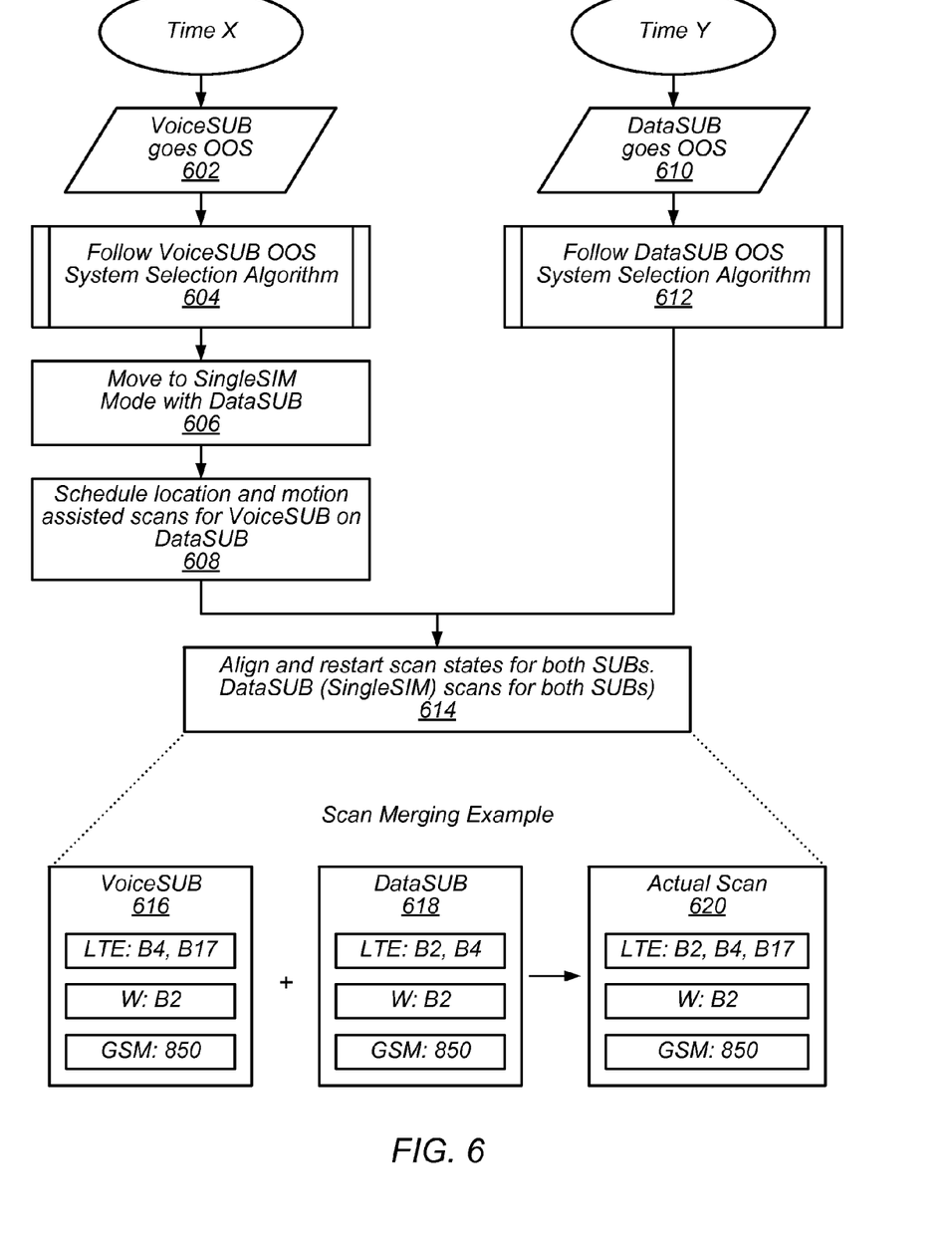
Figure 7:
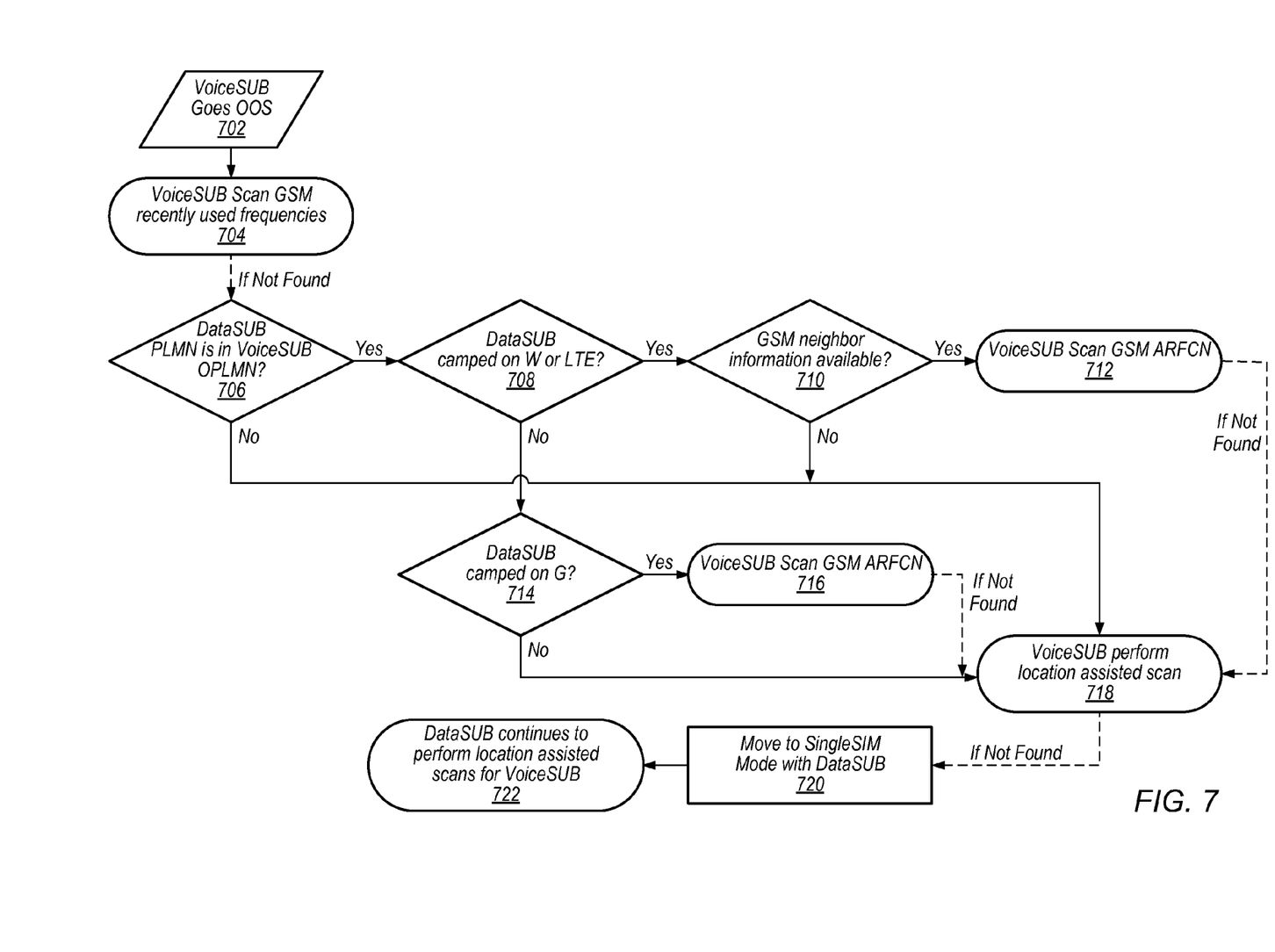
Figure 8:
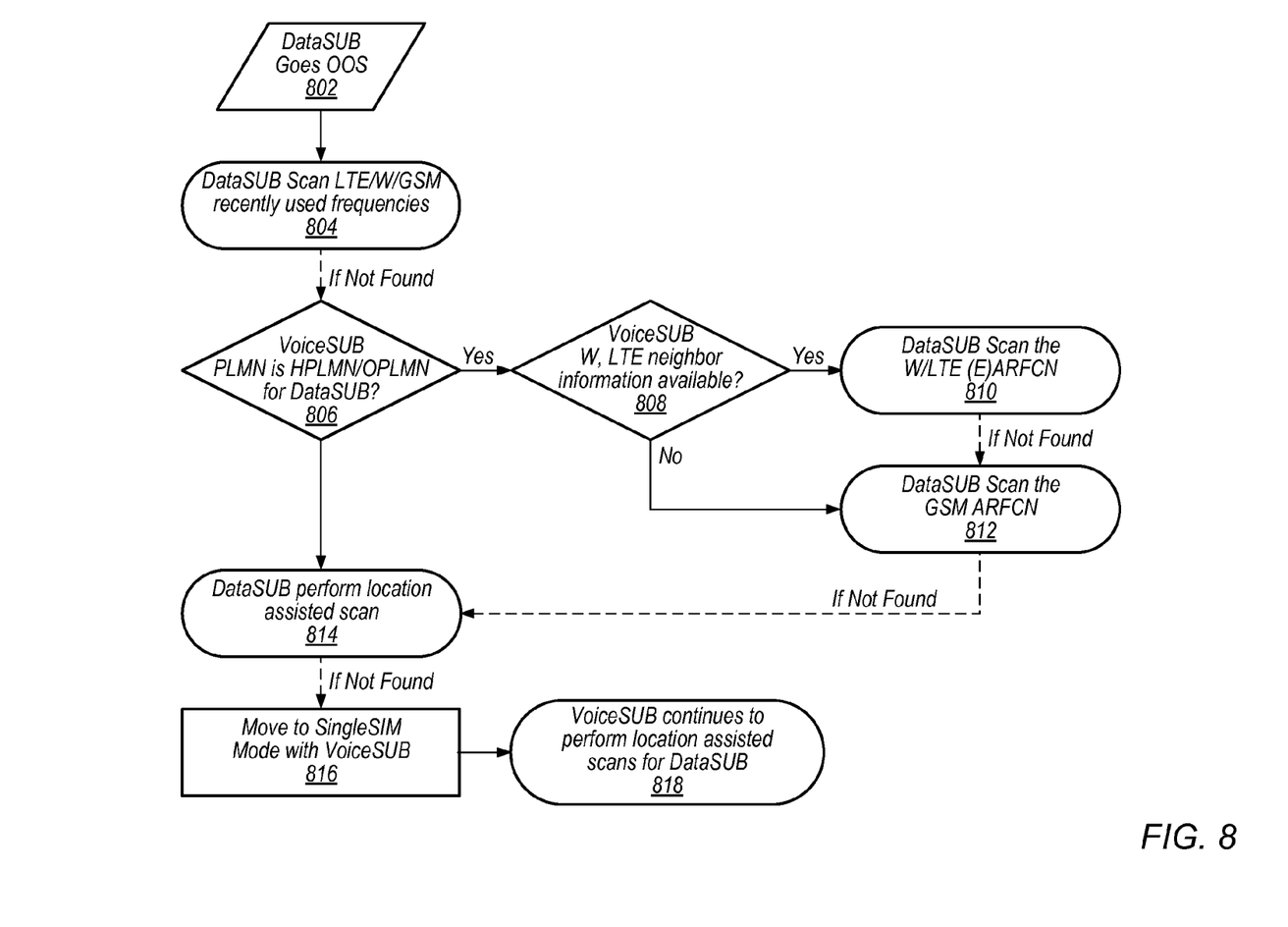

The methods of FIGS. 6-8 may be illustrative of system selection algorithms that may be used with a UE for which dual SIM functionality is available when in a roaming state. According to this dual SIM functionality, the first SIM, representing a first subscription, is available for voice services using GSM (also referred to as "G" for simplicity with respect to FIGS. 6-8), and the second SIM, representing a second subscription, is available for data services using GSM, WCDMA (also referred to as "W" for simplicity with respect to FIGS. 6-8), and LTE. Furthermore, in this particular scenario, the first SIM may be available for voice services using GSM or WCDMA when operating in single SIM mode. At least in some instances, the first SIM may also be available for data services using GSM, WCDMA, and/or LTE when operating in single SIM mode. As previously noted, any number of alternate implementations (e.g., in which voice services using LTE also available for the first SIM in single SIM mode, and/or in which WCDMA and/or LTE services (for voice and/or data) are available for the first SIM in dual SIM mode, among various possibilities) are also possible. Note that the first SIM may alternately be referred to as "voiceSUB", while the second SIM may alternately be referred to as "dataSUB", with respect to FIGS. 6-8.

Note that FIGS. 6-8 and the information provided herein below in conjunction therewith are provided by way of example of various considerations and details relating to possible systems with which the method of FIG. 5 may be implemented, and are not intended to be limiting to the disclosure as a whole. Numerous variations and alternatives to the details provided herein below are possible and should be considered within the scope of the disclosure.

FIG. 6 is a flowchart diagram illustrating an example method that may be performed by a dual SIM UE to jointly perform OOS service scanning for multiple SIMs. As shown, the method of FIG. 6 may operate as follows.

In 602, at a certain time ("Time X"), the voiceSUB may go OOS.

In 604, an OOS system selection algorithm for the voiceSUB may be followed. As one example possibility, the OOS system selection algorithm for the voiceSUB may correspond to the method of FIG. 7; alternatively, any of various other OOS system selection algorithms for the voiceSUB may be used.

In 606, if the OOS system selection algorithm is unsuccessful and the voiceSUB remains OOS, the UE may transition from dual SIM mode to single SIM mode, with the dataSUB as the active SIM.

In 608, location and motion assisted OOS scans for the voiceSUB may continue to be scheduled and performed by the dataSUB while the UE is operating in the single SIM mode.

In 610, at a certain time ("Time Y", where Y>X), the dataSUB may go OOS.

In 612, an OOS system selection algorithm for the dataSUB may be followed. As one example possibility, the OOS system selection algorithm for the dataSUB may correspond to the method of FIG. 8; alternatively, any of various other OOS system selection algorithms for the dataSUB may be used. If the OOS system selection algorithm is unsuccessful and the dataSUB remains OOS, both the dataSUB and the voiceSUB may be OOS.

In 614, since both SIMs may be OOS, the scan states for both the voiceSUB and the dataSUB may be restarted and aligned. One of the SIMs (e.g., the dataSUB) may scan for both SIMs.

Scanning for both SIMs may include using a scan list in which frequency channels and bands to be scanned for each SIM are combined in a merged scan list. As an example of such a merged scan list, a voiceSUB scan list 616 and a dataSUB scan list 618 are illustrated in FIG. 6, along with an actual scan list 620 including all of the frequency channels and bands listed in each of the voiceSUB scan list 616 and the dataSUB scan list 618.

As previously noted, FIG. 7 is a flowchart diagram illustrating an example method that may be performed by a dual SIM UE to attempt to perform system selection to re-acquire service in a scenario in which the voiceSUB goes out-of-service (OOS). As shown, the method of FIG. 7 may operate as follows.

In 702, the voiceSUB may go OOS.

In 704, the voiceSUB may scan any GSM frequency channels recently used by the voiceSUB. If any cells are found as a result of such scanning, the voiceSUB may camp on such a cell.

In 706, if no cells are found as a result of such scanning, it may be determined if the dataSUB PLMN is in an OPLMN list for the voiceSUB.

In 708, if the dataSUB PLMN is in the OPLMN list for the voiceSUB, it may be determined if the dataSUB is camped on a serving cell that operates according to either WCDMA or LTE.

In 710, if the dataSUB is camped on a serving cell that operates according to either WCDMA or LTE, it may be determined if GSM neighbor info is available from the dataSUB.

In 712, if GSM neighbor info is available from the dataSUB, the voiceSUB may scan the ARFCN(s) of the GSM cell(s) for which GSM neighbor info is available. If any cells are found as a result of such scanning, the voiceSUB may camp on such a cell.

In 714, if the dataSUB is not camped on a serving cell that operates according to either WCDMA or LTE, it may be determined if the dataSUB is camped on a serving cell that operates according to GSM.

In 716, if the dataSUB is camped on a serving cell that operates according to GSM, the voiceSUB may scan the ARFCN of the GSM serving cell of the dataSUB. If any cells are found as a result of such scanning, the voiceSUB may camp on such a cell.

In 718, if no cells are found as a result of such scanning, or if the dataSUB is not camped on a GSM, LTE, or WCDMA serving cell, or if the dataSUB is camped on a LTE or WCDMA serving cell but no GSM neighbor info is available, or if the dataSUB is camped on a LTE or WCDMA serving cell and GSM neighbor info is available but no cells are found as a result of scanning the frequencies for which such GSM neighbor info is available, or if the dataSUB PLMN is not in the OPLMN list of the voiceSUB, the voiceSUB may perform a location assisted scan. If any cells are found as a result of such scanning, the voiceSUB may camp on such a cell.

In 720, if no cells are found as a result of such scanning, the UE may transition to single SIM mode with the dataSUB as the active SIM.

In 722, the dataSUB may continue to perform location assisted scans for the voiceSUB while the voiceSUB enters and remains in a low power (e.g., sleep) mode.

Note that while FIG. 7 relates to an exemplary scenario in which a voiceSUB is available only for GSM in dual SIM mode, in an alternate implementation in which the voiceSUB is additionally available for WCDMA, LTE, and/or any of various other possible RATs, any number of additional or alternative steps (e.g., similar to some or all of the steps of FIG. 7) might be performed. For example, the voiceSUB might scan for WCDMA and/or LTE cells based on information from either or both of the voiceSUB or the dataSUB, in addition to scanning for GSM cells, and camp on such a cell if found.

FIG. 8 is a flowchart diagram illustrating an example method that may be performed by a dual SIM UE to attempt to perform system selection to re-acquire service in a scenario in which the dataSUB goes out-of-service (OOS). As shown, the method of FIG. 8 may operate as follows.

In 802, the dataSUB may go OOS.

In 804, the dataSUB may scan any LTE, WCDMA, or GSM frequency channels recently used by the dataSUB. If any cells are found as a result of such scanning, the dataSUB may camp on such a cell.

In 806, if no cells are found as a result of such scanning, it may be determined if the voiceSUB PLMN is in an OPLMN list for the dataSUB.

In 808, if the voiceSUB PLMN is in the OPLMN list for the dataSUB, it may be determined if WCDMA and/or LTE neighbor info is available from the voiceSUB.

In 810, if WCDMA and/or LTE neighbor info is available from the voiceSUB, the dataSUB may scan the (E)ARFCN(s) of the WCDMA/LTE cell(s) for which WCDMA and/or LTE neighbor info is available. If any cells are found as a result of such scanning, the dataSUB may camp on such a cell.

In 812, if no cells are found as a result of such scanning, or if WCDMA and/or LTE neighbor info is not available from the voiceSUB, the dataSUB may scan the GSM ARFCN of the GSM serving cell of the voiceSUB. If any cells are found as a result of such scanning, the dataSUB may camp on such a cell.

In 814, if no cells are found as a result of such scanning, or if the voiceSUB PLMN is not in the OPLMN list of the dataSUB, the dataSUB may perform a location assisted scan. If any cells are found as a result of such scanning, the dataSUB may camp on such a cell.

In 816, if no cells are found as a result of such scanning, the UE may transition to single SIM mode with the voiceSUB as the active SIM.

In 818, the voiceSUB may continue to perform location assisted scans for the dataSUB while the dataSUB enters and remains in a low power (e.g., sleep) mode.

Note also that while FIG. 8 relates to an exemplary scenario in which a voiceSUB is available only for GSM in dual SIM mode, in an alternate implementation in which the voiceSUB is additionally available for WCDMA, LTE, and/or any of various other possible RATs, any number of additional or alternative steps might be performed. For example, if the voiceSUB is camped on WCDMA or LTE, the dataSUB might scan for the WCDMA or LTE serving cell of the voiceSUB, in addition to scanning for WCDMA and/or LTE neighbor cells of the voiceSUB, and camp on such a cell if found.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer accessible memory medium, comprising program instructions for a wireless user equipment (UE) device that, when executed by the UE device, cause the UE to:
- determine that both a first subscriber identity module (SIM) of the UE device and a second SIM of the UE device are out-of-service (OOS);
- align service scanning timing for the first SIM and the second SIM;
- merge frequency scanning lists for the first SIM and the second SIM to produce a merged frequency scanning list; and
- perform service scanning for both the first SIM and the second SIM using the merged frequency scanning list according to the aligned service scanning timing.

2. The memory medium of claim 1,
wherein service scanning for both the first SIM and the second SIM is performed by one of the first SIM or the second SIM, wherein the other of the first SIM or the second SIM operates in a low power state while the service scanning for both the first SIM and the second SIM is performed.

3. The memory medium of claim 2, wherein when executed, the program instructions further cause the UE to:
- activate the SIM operating in the low power state if service information is discovered for the SIM operating in the low power state.

4. The memory medium of claim 1, wherein when executed, the program instructions further cause the UE to:
- perform system selection for one or both of the first SIM or the second SIM based on the service scanning for both the first SIM and the second SIM.

5. The memory medium of claim 1,
wherein performing service scanning for both the first SIM and the second SIM is also based at least in part on one or more of a location of the UE or motion detection of the UE.

6. The memory medium of claim 1, wherein the program instructions are further executable to:
- scan, using the first SIM of the UE, for service for the second SIM of the UE;
- provide, by the first SIM of the UE, an indication to the second SIM of the UE if service is found for the second SIM of the UE.

7. The memory medium of claim 6, wherein said scanning and providing is performed while the second SIM is OOS and the first SIM is in service.

8. A method, comprising:
at a user equipment (UE):
- determining that both a first subscriber identity module (SIM) of the UE device and a second SIM of the UE device are out-of-service (OOS);
- aligning service scanning timing for the first SIM and the second SIM;
- performing service scanning, by the second SIM of the UE, for both the first SIM and the second SIM according to the aligned service scanning timing; and
- providing, by the second SIM of the UE, an indication to the first SIM of the UE if service is found for the first SIM of the UE.

9. The method of claim 8, wherein the first SIM operates in a low power state while the service scanning for both the first SIM and the second SIM is performed.

10. The method of claim 9, further comprising:
- activating the first SIM operating in the low power state if service is found for the first SIM operating in the low power state.

11. The method of claim 8, further comprising:
- performing system selection for one or both of the first SIM or the second SIM based on the service scanning for both the first SIM and the second SIM.

12. The method of claim 8, wherein performing service scanning for both the first SIM and the second SIM is also based at least in part on one or more of a location of the UE or motion detection of the UE.

13. The method of claim 8, further comprising:
- scanning, using the first SIM of the UE, for service for the second SIM of the UE;
- providing, by the first SIM of the UE, an indication to the second SIM of the UE if service is found for the second SIM of the UE.

14. The method of claim 13, wherein said scanning and providing is performed while the second SIM is OOS and the first SIM is in service.

15. An apparatus, comprising:
one or more processing elements, wherein the one or more processing elements are configured for dual subscriber identity module (SIM) operation, wherein the one or more processing elements are configured to:
- determine that both a first subscriber identity module (SIM) of the UE device and a second SIM of the UE device are out-of-service (OOS);
- merge frequency scanning lists for the first SIM and the second SIM to produce a merged frequency scanning list;
- perform, by the second SIM, service scanning for both the first SIM and the second SIM using the merged frequency scanning list; and
- provide, by the second SIM of the UE, an indication to the first SIM of the UE if service is found for the first SIM of the UE.

16. The UE of claim 15, wherein the first SIM operates in a low power state while the service scanning for both the first SIM and the second SIM is performed.

17. The UE of claim 16, wherein the one or more processing elements are further configured to:
- activate the first SIM operating in the low power state if service is found for the first SIM operating in the low power state.

18. The UE of claim 15, wherein the one or more processing elements are further configured to:
- perform system selection for one or both of the first SIM or the second SIM based on the service scanning for both the first SIM and the second SIM.

19. The UE of claim 15, wherein performing service scanning for both the first SIM and the second SIM is also based at least in part on one or more of a location of the UE or motion detection of the UE.

20. The UE of claim 15, wherein the one or more processing elements are further configured to:
- scan, using the first SIM of the UE, for service for the second SIM of the UE;
- provide, by the first SIM of the UE, an indication to the second SIM of the UE if service is found for the second SIM of the UE.

* * * * *